(12) United States Patent
O'Halloran et al.

(10) Patent No.: US 11,052,739 B2
(45) Date of Patent: Jul. 6, 2021

(54) QUICK RELEASE WINDOW GASKET FOR ESCAPE WINDOW

(71) Applicant: AGCO Corporation, Duluth, GA (US)

(72) Inventors: Christopher Paul O'Halloran, Hesston, KS (US); Paul Linwood Holman, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 49 days.

(21) Appl. No.: 16/715,853

(22) Filed: Dec. 16, 2019

(65) Prior Publication Data

US 2020/0189373 A1 Jun. 18, 2020

Related U.S. Application Data

(60) Provisional application No. 62/779,942, filed on Dec. 14, 2018.

(51) Int. Cl.
*B60J 10/70* (2016.01)
*B60J 1/20* (2006.01)

(52) U.S. Cl.
CPC .............. *B60J 10/70* (2016.02); *B60J 1/2094* (2013.01)

(58) Field of Classification Search
CPC ........... B60J 10/70; B60J 1/2094; B60J 10/35
USPC ....................................................... 296/201
See application file for complete search history.

(56) References Cited

U.S. PATENT DOCUMENTS

| 6,871,902 | B2 * | 3/2005 | Carson | B60J 1/2094 |
| | | | | 296/146.15 |
| 7,011,356 | B2 * | 3/2006 | Stahl | B60J 1/12 |
| | | | | 160/368.1 |
| 7,152,906 | B1 * | 12/2006 | Farrar | B60J 1/007 |
| | | | | 296/146.15 |
| 2011/0084521 | A1 * | 4/2011 | Shellenberger | B60J 1/06 |
| | | | | 296/193.08 |

FOREIGN PATENT DOCUMENTS

| DE | 9003934 U | 7/1990 |
| FR | 2788554 A1 | 7/2000 |
| GB | 739777 A | 11/1955 |
| JP | 3202866 B | 8/2001 |

OTHER PUBLICATIONS

UK Intellectual Property Office, Search Report for related UK Application No. GB1900146.0, dated Jun. 28, 2019.

* cited by examiner

*Primary Examiner* — Pinel E Romain

(57) ABSTRACT

A window assembly moveable between open and locked positions having a pane of window glass held in a gasket attached to a window frame with adhesive. When in the locked position, the gasket has a removable pull strip enclosed in an internal channel which when removed allows the gasket to move to the open position, allowing safe exit through the window opening.

5 Claims, 2 Drawing Sheets

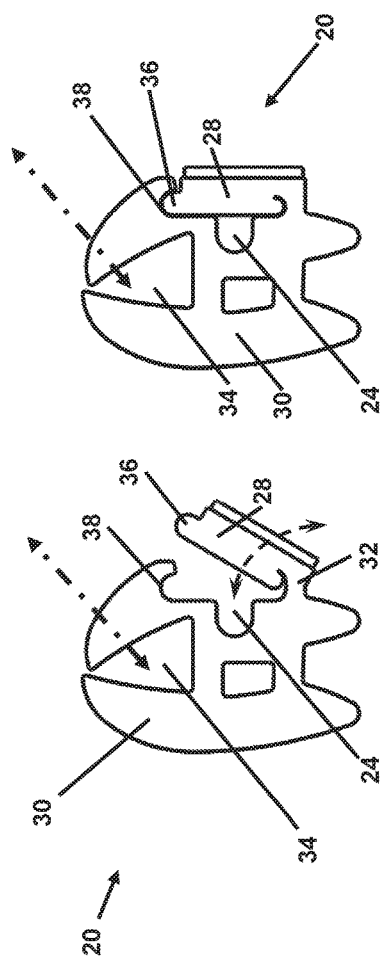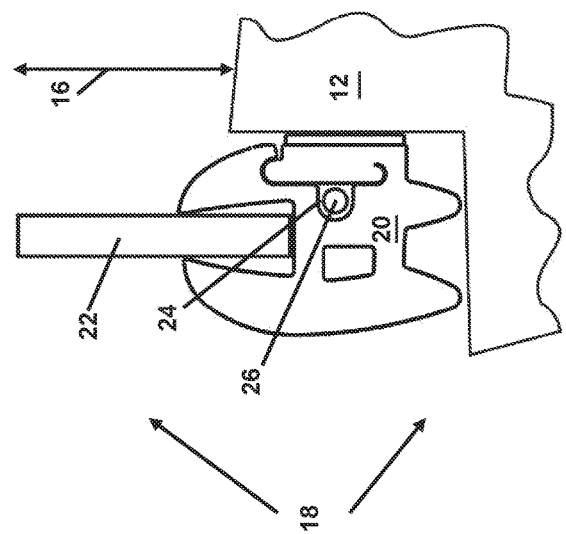

QUICK RELEASE WINDOW GASKET FOR ESCAPE WINDOW

CROSS-REFERENCE TO RELATED APPLICATIONS

This application is a non-provisional application of US Provisional Application No. 62/779,942, filed Dec. 14, 2018, the entire disclosure of which is incorporated herein by reference.

BACKGROUND

Field

The invention relates to a breakaway gasket for an escape window of a vehicle.

Description of Related Art

While escape windows for vehicles are available today, they typically are made of breakable tempered glass. The glass sits on a window gasket glued into a flange of a vehicle door or frame. To use the window opening as an emergency exit, the operator must utilize a glass break hammer to break the tempered glass and exit the vehicle.

The currently known escape window options for a working vehicle are troublesome because breakable tempered glass does not allow for layering an acoustic barrier for the cab as the tempered glass must break apart totally to allow safe exit from the cab. The present invention was made in view of the above problem and its object is to provide for the installation of a laminate window material with acoustic barrier for the cab while providing a safe, speedy escape route from the cab when needed.

BRIEF SUMMARY

The invention is directed to a locking, quick release window gasket that is attached to a vehicle frame with adhesive and holds window glass in place. The gasket has a removable pull strip enclosed in an internal channel and a locking mechanism which locks the gasket in a closed position, securing the window glass. When the pull strip is pulled, the closed gasket is unlocked and moves to an open position, releasing the glass and allowing safe exit through the window opening. The open and closed positions are possible without breaking the glass because the gasket pull strip, when released allows the gasket (and window) to move to an open position. Additionally, the gasket is positioned on the vehicle frame with adhesive, rather than inside a flange, which restricts opening of the glass for emergency exit. The positioning of the quick release gasket on the frame coupled with the gaskets function in an open or closed position fully address the problems presented by a conventional frame, flange, gasket, glass configuration on a working vehicle.

BRIEF DESCRIPTION OF THE DRAWINGS

The disclosed subject matter will be further explained with reference to the attached figures, wherein like structure or system elements are referred to by like reference numerals throughout the different views.

FIG. 2 depicts the window assembly with quick release gasket, glass, frame configuration in the closed position.

FIG. 3A depicts the extruded gasket in the open position.

FIG. 3B depicts the gasket in the closed position.

Corresponding reference characters indicate corresponding parts throughout the views of the drawings.

DESCRIPTION OF EXAMPLE EMBODIMENTS

Figure 1:
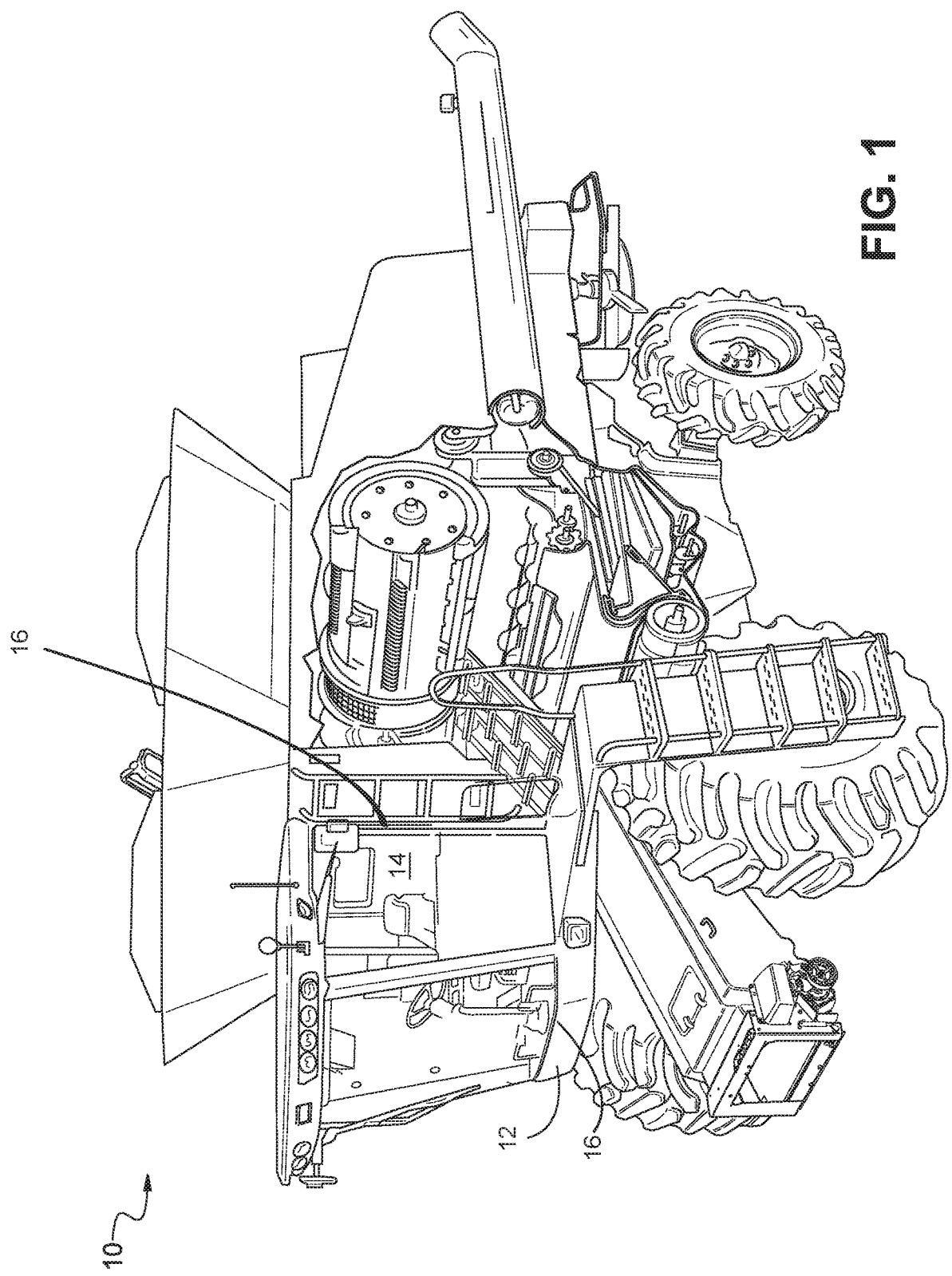
FIG. 1 depicts an Agricultural Vehicle

The following detailed description illustrates the invention by way of example and not by way of limitation. This description will clearly enable one skilled in the art to make and use the invention, and describes embodiments, adaptations, variations, alternatives and uses of the invention, including what we presently believe is the best mode of carrying out the invention. Additionally, it is to be understood that the invention is capable of other embodiments and of being practiced or being carried out in various ways. Also, it is to be understood that the phraseology and terminology used herein is for the purpose of description and should not be regarded as limiting.

In one embodiment, an Agricultural vehicle (10) has a frame (12) and a cab (14) for the vehicle operator. The cab (14) has a window opening (16) and a window assembly (18) attached to the frame (12) and received in the window opening (16). The window assembly (18) is made up of a gasket (20) and a window pane (22).

Referring now to FIG. 2, the window assembly (18) has two conditions, the first condition is where the window pane (22) covers the window opening (16) and is held in place by the gasket (20) being in the locked position. When in the locked position, the gasket (20) forms a closed cavity (24) containing a removable pull strip (26) and the gasket is attached to the frame (12) of the vehicle (10) with an adhesive.

The second condition of the window assembly (18) is when the window pane (22) is removed from the window opening (16) when the gasket (20) has been moved to an open position allowing the window pane (22) to be released from the window opening (16).

Referring now to FIG. 3A, with the gasket (20) in the open position, the components can most clearly be seen and include an flap (28) moveable between the open position and the locked position, a base (30) connected to the flap (28) by a hinge portion (32), a channel (34) along the longitudinal length of the gasket (20) for receiving the window glass (22); and a detent (36) which is part of the latching mechanism of the gasket (20). The base (30) has a notch (38) along the longitudinal length of the gasket (20) for receiving the detent (36) of the flap (28) when moved to the locked position.

Referring now to FIG. 3B, when the gasket (20) is in the locked position, the detent (36) of the flap (28) is in the notch (38) of the base (30) to keep the flap (28) in the locked position. Additionally, when in the locked position, the closed cavity (24) is formed along the longitudinal length of the gasket (20) and encases the removable pull strip (26). In this locked position, the channel (34) along the length of the flap (28) may receive and hold the window glass (22). The window assembly (18) in the locked position with glass (22) intact, is positioned on the frame (12) to cover the window opening (16) and the gasket (20) is adhered to the frame (12) by an adhesive material.

The window opening (16) may be used for exiting the vehicle (10) in an emergency, by pulling on the pull-strip (26) and removing the pull strip from the cavity (24) thus forcing the detent (36) of the flap (28) out of the notch (38) of the base (30) and releasing the flap (28) to move to the open position.

The gasket (20) of one embodiment is extruded from an EPDM material but may be made of any material which is flexible enough to move between the open and closed positions, yet rigid enough to securely hold a pane of glass (22) inserted into the channel (34) of the flap (28) when the gasket (20) is in the closed position.

Besides the properties discussed above, it is desirable that the gasket (20) be made of a material that bonds well with the adhesive material used to secure the gasket (20) to the frame (12) of the vehicle (10). In one embodiment, a viscoelastic acrylic adhesive was used as the adhesive material. However, many suitable adhesive materials are commercially available so will not be discussed at length here. The adhesive material should be compatible with the frame (12) and the gasket (20) and provide a strong bond which can withstand the rigors of the environment where the vehicle (10) will be operated.

Because many various type of layered laminate glass (22) are known in the art, more detail will not be discussed here, except to say that sound damping properties are desirable in a working vehicle (10).

The invention is directed to use on a working vehicle (10), such as an agricultural tractor. However, one skilled in the art will understand that the window assembly (18) with quick release gasket (20) as disclosed herein may be used in other types of vehicles or non-mobile settings where quick, safe exit through a window opening may become necessary.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

At least the following is claimed:

1. A window assembly comprising:
   a pane of window glass; and
   a quick release gasket comprising:
      a flap with a channel for holding the pane and moveable between an open position and a locked position;
      a base connected to the flap by a hinge portion; and
      a locking mechanism comprising:
        a detent along a lateral length of the flap;
        a notch along a lateral length of the base;
        a removable pull strip; and
        a cavity in the base for receiving the pull strip,
   wherein the detent of the flap fits into the notch of the base and the pull strip is enclosed in the cavity when the window assembly is in the locked position.

2. The window assembly of claim 1 wherein the pane of window glass is layered laminate glass.

3. The window assembly of claim 1, configured so that the pane of glass covers a window opening wherein the gasket, is secured to a frame of the window opening by an adhesive.

4. The window assembly of claim 1, wherein when the pull-strip is removed from the cavity of the base, the flap of the gasket moves to the open position.

5. The window assembly of claim 1, wherein the gasket is secured to the frame of an agricultural vehicle.

\* \* \* \* \*